Oct. 25, 1927.

M. BIRKIGT 1,647,032

GEAR WHEEL TRANSMISSION

Filed July 18, 1924     4 Sheets-Sheet 3

Inventor
Marc Birkigt
By James L. Norris
Attorney

Oct. 25, 1927.

M. BIRKIGT 1,647,032

GEAR WHEEL TRANSMISSION

Filed July 18, 1924    4 Sheets-Sheet 4

Patented Oct. 25, 1927.

1,647,032

UNITED STATES PATENT OFFICE.

MARC BIRKIGT, OF BOIS COLOMBES, FRANCE.

GEAR-WHEEL TRANSMISSION.

Application filed July 18, 1924, Serial No. 726,874, and in Belgium July 18, 1923.

This invention relates to gear-wheel transmissions for actuating variable-resistance elements and more particularly to those transmissions whereby cams are controlled, simultaneously with a pump, in internal-combustion engines.

The invention has for its object to render such transmissions more suitable for answering various practical requirements.

The invention comprises fitting transmissions of the kind in question (which have sets of multiple gears) not only, as heretofore, with one brake causing permanent contact between the teeth of the last set of gears and arranged so as to take effect upon the shaft on which the variable-resistance elements are carried, but with several such brakes, disposed so as to cause the teeth of the other sets of gears to be in permanent contact.

Another arrangement according to this invention concerns the case of the transmissions already referred to which simultaneously operate a pump and to which a brake is to be fitted for permanent contact between the teeth of their gears, in which arrangement the brake is combined with the pump.

Figure 1:
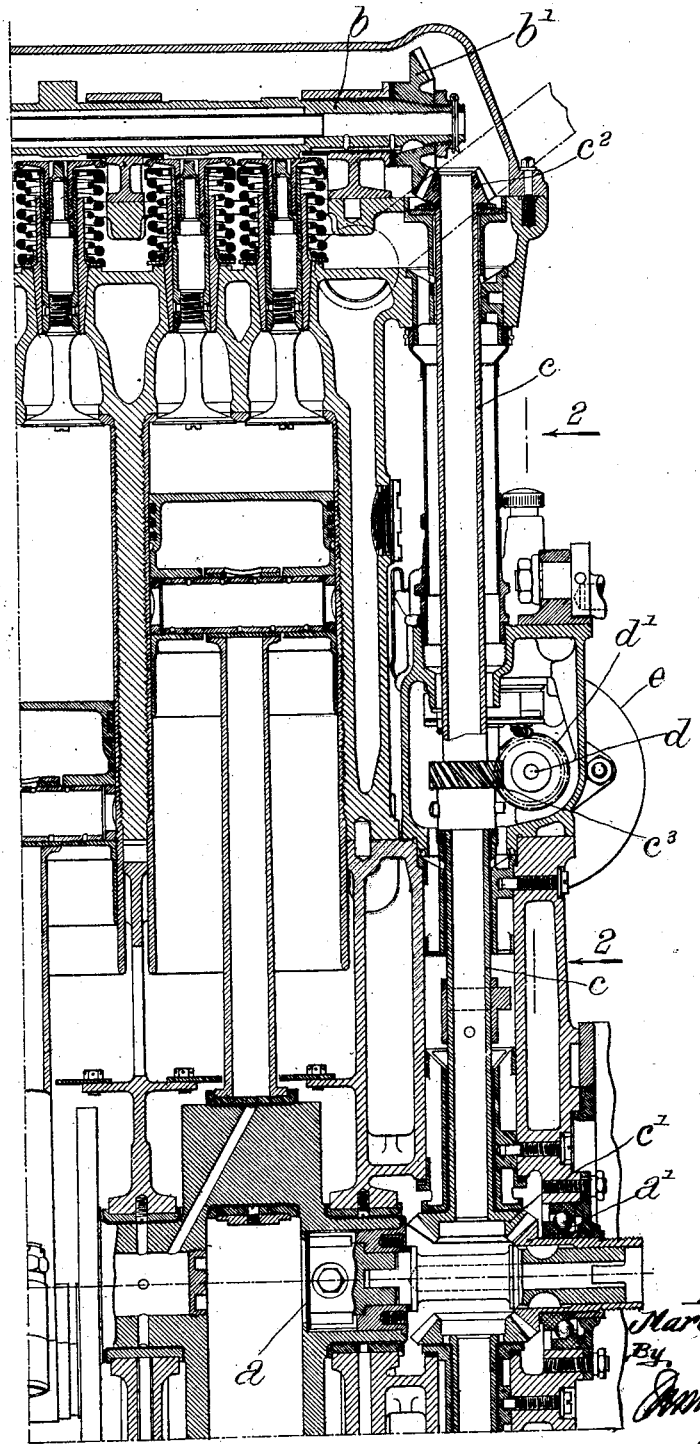
Figure 2:
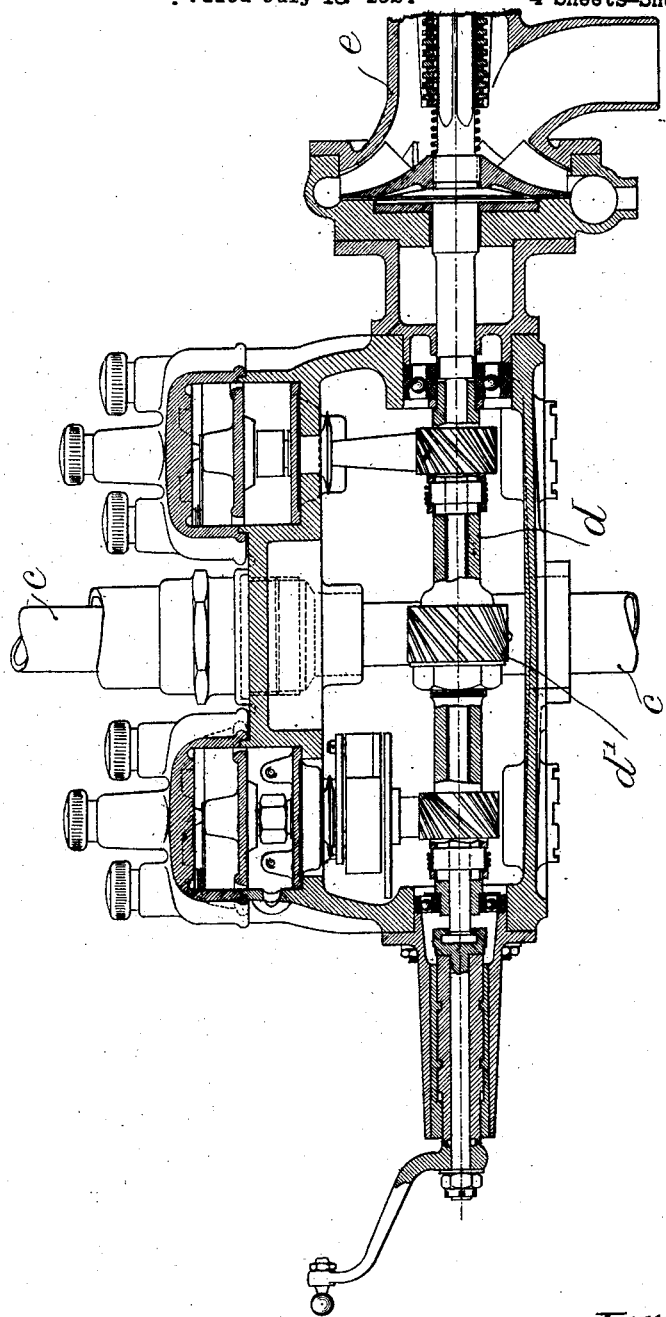

The invention will now be described in the following description referring to the accompanying drawings, the said description and drawings being given by way of example:

Figures 1 and 2 show in longitudinal section and in cross-section on an enlarged scale along the line 2—2 of Figure 1 respectively the front portion of an internal-combustion engine having one row of vertical cylinders and in which the cams are actuated, simultaneously with a water pump, by a transmission according to the invention.

Figure 3:
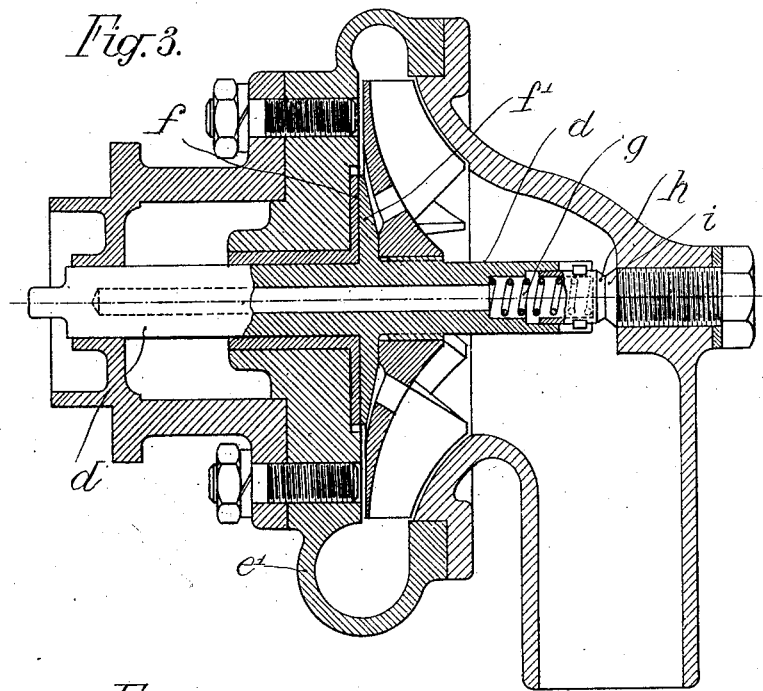
Figure 4:
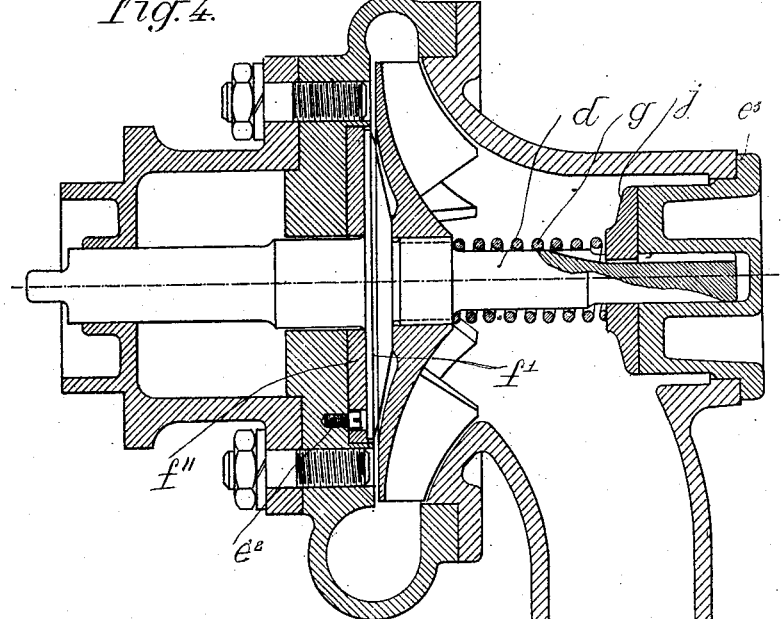
Figure 5:
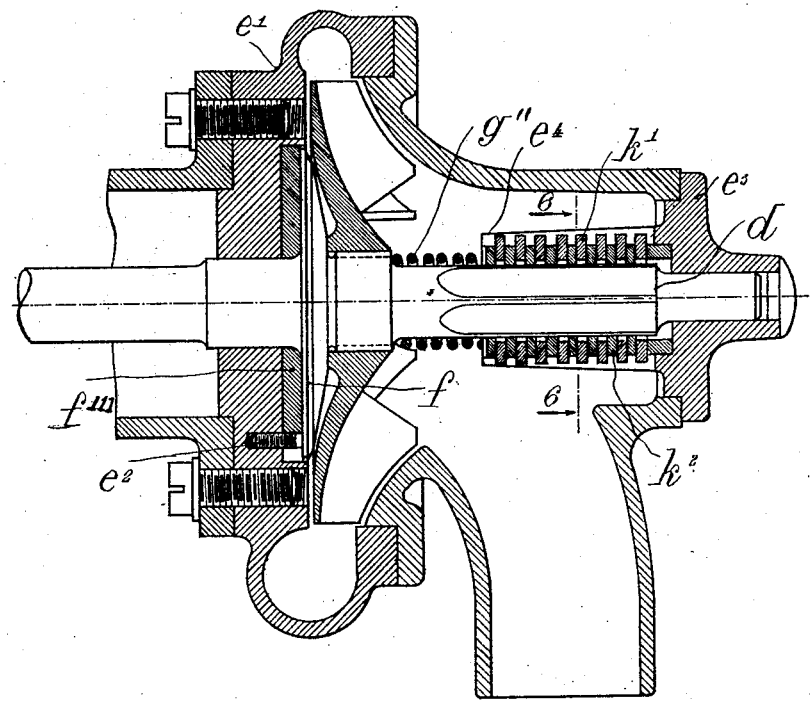

Figures 3, 4 and 5 show in longitudinal section details of the water pump combined with the brake, according to three constructions of the invention.

Figure 6:
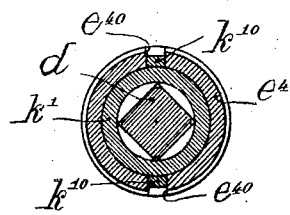

Figure 6 is a cross-section, on the line 6—6 of Figure 5, of a detail of the construction illustrated in Figure 5.

The internal-combustion engine shown in the drawings has a single row of cylinders and one cam shaft $b$ actuated by the crankshaft $a$ with the aid of a transmission through two sets of gears. The said transmission is constituted by the intermediate shaft $c$ and by the gear-wheels $a^1$ and $c^1$ and $c^2$ and $b^1$, the said transmission simultaneously actuating, through the bevel toothed wheels $c^3$ and $d^1$ the shaft $d$ of a rotary water pump $e$. The transmission is provided with a device for causing contact between the front faces of the teeth of the gear wheel $a^1$ with the rear faces of the teeth of the gear wheel $c^1$ also, the operation is as follows:—

The shaft $c$ is provided with a device for permanent braking which is caused to act either directly on the shaft $c$ or on the shaft $d$, driven by the said shaft $c$, and actuating the water pump $e$. In this second case it is advantageous to combine the said permanent-braking arrangement with the said pump and it is also advantageous to dispose the said device within the pump and immerse it in the water flowing therethrough, for the purpose of preventing the said device from becoming heated owing to the friction and for lubricating the surfaces in contact and preventing the said elements under friction from seizing, this being the reason for constituting the said permanent braking device.

The device comprises a fibre flanged disc $f$ as particularly shown in Fig. 3, plain disc $f''$ as shown in Fig. 4 or plane disc $f'''$ as shown in Fig. 5, either one being rigidly connected to the pump casing $e^1$ for example by square engaging parts or by one or more pins $e^2$ or by any other suitable means, and a metal disc $f^1$ rigidly secured to the shaft $d$ of the pump. The necessary pressure is produced between these two members by any suitable means, for example by arranging between these two members (as shown in Figure 3) a spring $g$ within the suitably arranged shaft $d$, the said spring bearing on an abutment $h$ resting against a fixed abutment $i$ and adapted to slide at the end of the shaft $d$, and also partake in its rotation, as the shaft $d$ is rotated by the shaft $c$.

This device satisfies the requirements mentioned above and produces hermetic sealing between the shaft $d$ and the pump casing $e^1$ owing to the friction of the disc $f^1$ on the fibre disk $f$, $f''$ or $f'''$.

The reaction of the spring $g$ or $g'$ (Fig. 4) may be used, which spring $g'$, as shown in Fig. 4, is there arranged around the shaft $d$ instead of being located within the latter as shown in Fig. 3, by disposing within the pump a second braking device similar to the first, either as shown in Figure 4, by a disc $j$ mounted on the shaft $d$ with a long pin or with a square member, or by any other suitable means whereby the said disc may be rotated by the shaft $d$ and may freely slide thereon, the said disc $j$ being pressed by the spring $g$ against a flat surface provided on the cap $e^3$ of the pump.

As shown in Figures 5 and 6, two series of alternated discs are provided, the discs $k^1$ of one series being rigidly connected to the cap $e^3$ of the pump by providing them with one or more projections $k^{10}$ and by providing the cap $e^3$ with a sleeve member $e^4$ surrounding the discs $k^1$ and in which grooves $e^{40}$ are provided, the said grooves being engaged by the projections $k^{10}$ of the said discs $k^1$, the other discs $k^2$ being inserted between the discs $k^1$ and pressed against them by the spring $g''$, the said discs $k^2$ being mounted on the shaft $d$ and operatively connected thereto by a long pin or a square or by any other convenient means whereby the discs $k^2$ may be actuated by the shaft $d$ and all the discs $k^1$ and $k^2$ may be allowed to slide freely on the said shaft $d$.

Thus, a pump is obtained which is provided with a double braking device the working of which is the same as that previously described.

Obviously, the invention is not limited to the constructions described in detail, but covers any modification within the scope of the claims.

Having now particularly described and ascertained the nature of my said invention and in what manner the same is to be performed, I declare that what I claim is:—

1. A transmission for internal combustion engines of the class specified, comprising a driving shaft and driven mechanism including a water cooling unit, gear devices between the driving shaft and driven mechanism, and braking means within the water cooling unit and operating to maintain the gear devices between the driving and driven mechanism in constant engagement.

2. A transmission for internal combustion engines of the class specified, comprising a driving shaft and driven mechanism including a cooling unit with a shaft, gear devices between the driving shaft and driven mechanisms and the shaft of the cooling unit for simultaneously driving the said cooling unit shaft, and a braking device within the cooling unit and associated with its shaft for maintaining constant engagement of the gear devices between the driving shaft and driven mechanism.

3. A transmission for internal combustion engines of the class specified, comprising a driving shaft, driven mechanism including a pump having a shaft geared to said driven mechanism, gear devices being interposed between the driving shaft and driven mechanism, and a braking device mounted in the pump and associated with the shaft of the latter and surrounded by the liquid passing through the pump for maintaining constant engagement of the gear devices between the driving shaft and driven mechanism.

4. A transmission for internal combustion engines of the class specified, comprising a driving shaft, driven mechanism including a pump having a shaft actuated by a part of the driven mechanism and gear devices between the driving shaft and driven mechanism, and braking mechanism within the pump consisting of a disk disposed at the driving point of the shaft of the pump in the casing of the latter and a second spring-actuated disk mounted on the pump shaft.

5. A transmission for internal combustion engines of the class specified, comprising a driving shaft, driven mechanism and gear devices between the driving shaft and driven mechanism, a pump having a shaft geared to a part of the driven mechanism, a fiber disk mounted on a part of the pump casing at the driving point of the shaft of the pump in the said casing, a second disk associated with the pump shaft and having a spring cooperating therewith, the said spring being operatively mounted in relation to the shaft and abutting at its free end on a surface moving with the shaft, and a stationary thrust means to which is transmitted the pressure of the spring.

6. A transmission for internal combustion engines of the class specified, comprising a driving shaft, driven mechanism and gear devices between the driving shaft and driven mechanism, a pump having a shaft geared to a part of the driven mechanism, contacting disk devices respectively applied to a part of the casing of the pump and to the shaft, and a spring cooperating with the disk devices carried by the shaft, the spring acting upon axially movable braking surfaces.

7. In a transmission for internal combustion engines of the class specified, a driving shaft, driven mechanism and gear devices between the driving shaft and driven mechanism, a pump having a shaft operatively geared to a part of the driven mechanism, and braking means within the pump and surrounded by the liquid passing through the pump, there being one set of gear devices between the driving and driven mechanism and between the latter and the pump shaft.

8. A transmission for internal combustion engines of the class specified, comprising a driving shaft, a driven shaft, a single set of gear wheels between the driving and driven shaft, a pump having a shaft with a gear device actuated by the driven shaft to drive the pump for the purpose of circulating liquids, and an automatically operating braking means within the pump surrounded by the liquid passing through the said pump for maintaining constant engagement of the gear devices between the driving and driven shaft.

In testimony whereof I have hereunto set my hand.

MARC BIRKIGT.